June 24, 1930. T. H. FOREHAND 1,766,333
REPAIR INSTRUMENT
Filed April 16, 1928
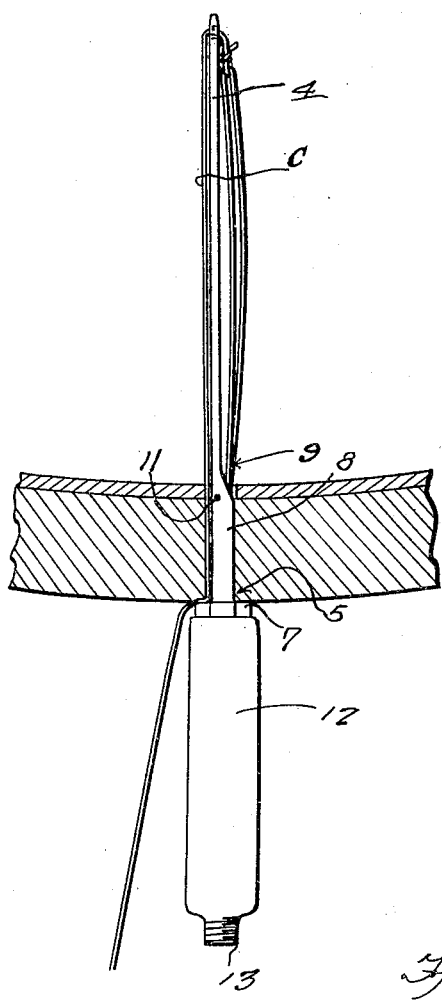
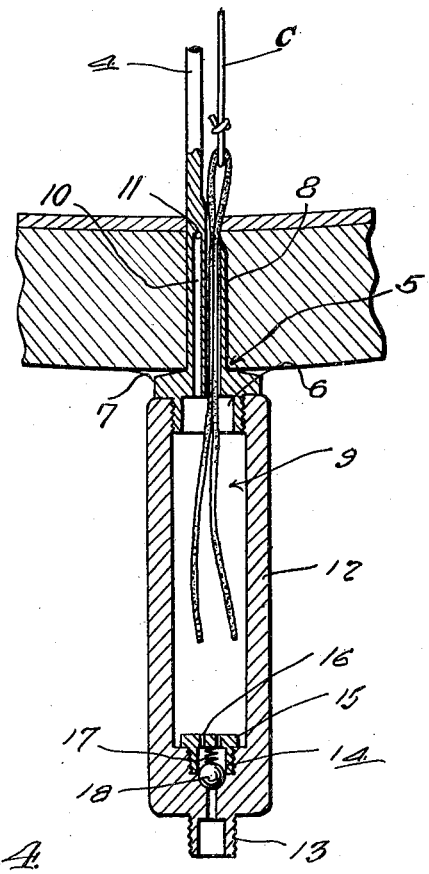
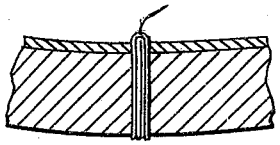
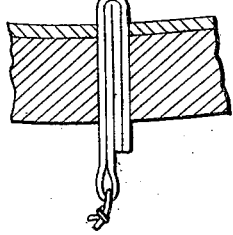
Inventor
T. H. Forehand
By Clarence A. O'Brien
Attorney Patented June 24, 1930

1,766,333

UNITED STATES PATENT OFFICE

THOMAS H. FOREHAND, OF NASHVILLE, TENNESSEE

REPAIR INSTRUMENT

Application filed April 16, 1928. Serial No. 270,393.

This invention relates to an improved automotive appliance, in the form of an instrument for repairing small leaks in pneumatic inner tubes and tire casings therefor, for instance, where the puncture occurs from a tack, a nail, or other small pointed implement.

Broadly, the invention has reference to an especially constructed device for inserting and anchoring a rubber band in the hole of the inner tube and casing section.

More specifically stated, the instrument embodies an especially constructed needle formed to accommodate the rubber band, and a pull cord which is attached to the band, together with means associated with the base of the needle for supplying a limited quantity of gum or a suitable adhesive to the rubber band to cause it to remain in place and plug the holes.

The specific details and their relative arrangement and association will become more readily apparent from the following description and drawings.

In the drawings:—

Figure 1 is a side elevational view of a repair instrument constructed in accordance with the present invention showing the manner in which the needle is forced through alined holes in the tire casing and inner tube, the latter details being shown in section.

Figure 2 is a view in section and elevation showing the relationship of the rubber band which is used as a closing plug.

Figure 3 is a fragmentary view showing a step in the operation wherein the bight portion of the rubber band is formed into a return bend and drawn outwardly through the holes in the tube and casing for finishing the repair.

Figure 4 is a view similar to Figure 3, showing the repair finished.

Referring now to the drawings by reference numerals, it will be observed that the numeral 4 designates an elongated needle having an eye at its outer end and a fitting 5 at its inner end. This fitting comprises an externally screw threaded coupling 6 and an outstanding nut-flange 7. Adjacent the fitting, the needle is increased in cross sectional proportion on one side as indicated at 8 to provide a guide passage for the rubber band 9.

Incidentally, this rubber band is preferably of an especially made rubber, although an ordinary rubber band will serve as a makeshift means. This portion of the needle is also formed with a bore 10 having small discharge ports 11 from which liquid cement, gum, glue or the like is forcibly ejected.

Attached to the rubber band by tying or otherwise, is a pull cord C made of some strong material, this being threaded through the eye and brought back down along the side of the needle, somewhat as shown in Fig. 1.

The needle is separably coupled to an elongated cylindrical container 12, for the adhesive cement (not shown). One end of the container is screw-threaded to accommodate the coupling 6. On the other end is a nipple 13 externally screw threaded to accommodate the attaching head of an ordinary tire pump (not shown).

There is a socket inside of the container at this point, into which the screw threaded portion 14 of a small plug 15 is threaded. The plug is formed with air ports 16 and equipped with a small spring 17 which serves to press a ball check valve 18 against its seat. This ball valve is normally seated, but is unseated by the action of air pressure from the air pump which is attached to the nipple 13.

The purpose of the air pump is to force a limited quantity of the adhesive (not shown) through the passage or bore 10, the ports 11 and the guide 8.

In making the instrument ready for use, the cord C is tied to the rubber band 9, which has been previously passed through the guide so that it is in the position shown in Fig. 2. A small quantity of suitable adhesive compound or material is now placed in the container 12. Then the fitting 5 is threaded into the screw-threaded end portion of the container, causing the parts to take the mechanical relationship represented in Figure 2. With the details in this relation, the pointed end of the needle is forced through the alined holes in the tire and tube after the nail or other puncture implement is pulled out. The needle is pushed through to assume the position seen in Figure 1, at which time the nut-flange bears against the tread of the tire casing. The pullcord C is of course held in a manner to dispose the free end thereof outwardly through the punctured hole. The cord is now pulled in a manner to draw the rubber band from the position seen in Figure 2, into the position seen in Figure 1.

Now the cord and needle are simultaneously drawn back through the hole, and at an appropriate time, a tire pump is threaded on the nipple 13. As a general rule, one stroke of the pump serves to force sufficient adhesive through the passage 8 as well as through the port 11 and the adjoining bore 10.

The instrument is removed from the holes very slowly, pulling the needle and the cord together. As soon as the needle is clear of the tire (see Figure 3), the rubber is clipped off, even with the tire, leaving the four ends of the rubber band barely exposed as shown in Fig. 4, at which time, the repair is complete, and the tire ready to be inflated to the proper pressure.

It is thought that by considering the description in connection with the drawings, a clear understanding of the construction, operation, and efficiency of the invention will be clear. Consequently, a more lengthy description is regarded unnecessary.

Minor changes in shape, size, and rearrangement, coming within the field of invention claimed, may be resorted to if desired.

Having thus described my invention, what I claim as new is:—

1. A tire repair instrument of the class described comprising a needle adapted to be passed thru openings in a tire and inner tube produced by a puncture, a rubber band mounted upon the needle, a pull cord attached to the band and to the needle, together with means for applying adhesive material to the rubber band.

2. A tire repair instrument of the class described comprising a needle provided at one end with an eye for passage of a pull cord and provided at its opposite end with a guiding and retaining means for a puncture sealing element, together with means separably connected with said needle for applying adhesive to the sealing element.

3. A tire repair instrument of the class described comprising a needle provided at one end with an eye for passage of a pull cord and provided at its opposite end with a guiding and retaining means for a puncture sealing element, together with means separably connected with said needle for applying adhesive to the sealing element, said means being constructed to accommodate a tire pump whose air pressure is employed for ejecting the adhesive material.

4. A tire repair instrument comprising a cylindrical adhesive container, and a needle separably connected with one end of the container, said needle being constructed for passage through a puncture, having an adhesive passage at its inner end, and guiding and retaining means for a puncture sealing element.

5. A tire repair instrument comprising a cylindrical adhesive container, and a needle separably connected with one end of the container, said needle being constructed for passage through a puncture, having an adhesive passage at its inner end, guiding and retaining means for a puncture sealing element, said container being formed at the opposite end with a valved passage, and a pump attaching nipple.

6. A tire repair instrument of the class described comprising a cylindrical container having a screw threaded nipple at one end, a check valve at said one end, and being internally screw threaded at its opposite end, a needle provided with a coupling threaded into the last named end of the container, said needle having an adhesive passage provided with discharge ports, and said needle being further provided with an elongated guide for passage of a rubber band puncture sealing element.

In testimony whereof I affix my signature.

THOMAS H. FOREHAND.